US010931723B2

(12) United States Patent
Jokela et al.

(10) Patent No.: US 10,931,723 B2
(45) Date of Patent: Feb. 23, 2021

(54) SOLUTION FOR ESTABLISHING A COMMUNICATION SESSION

(71) Applicant: Telia Company AB, Solna (SE)

(72) Inventors: Harri Jokela, Helsinki (FI); Markus Kullberg, Helsinki (FI); Jonas Lemberg, Porvoo (FI)

(73) Assignee: TELIA COMPANY AB, Solna (SE)

(*) Notice: Subject to any disclaimer, the term of this patent is extended or adjusted under 35 U.S.C. 154(b) by 0 days.

(21) Appl. No.: 16/373,954

(22) Filed: Apr. 3, 2019

(65) Prior Publication Data

US 2019/0306203 A1 Oct. 3, 2019

(30) Foreign Application Priority Data

Apr. 3, 2018 (FI) .................................... 20185307

(51) Int. Cl.
*H04L 29/06* (2006.01)
*H04L 12/14* (2006.01)
(Continued)

(52) U.S. Cl.
CPC .......... *H04L 65/1069* (2013.01); *H04L 12/14* (2013.01); *H04L 12/66* (2013.01);
(Continued)

(58) Field of Classification Search
CPC ... H04L 65/1069; H04L 65/104; H04L 12/66; H04L 65/4015; H04L 12/14;
(Continued)

(56) References Cited

U.S. PATENT DOCUMENTS 8,359,004 B2 * 1/2013 Cheng ................... H04M 15/44
455/406
8,861,692 B1 * 10/2014 Phelps ................... H04M 15/39
370/401
(Continued)

FOREIGN PATENT DOCUMENTS

GB 2517760 A 3/2015
WO 2016/156256 A1 10/2016

OTHER PUBLICATIONS

Finnish Search Report, dated Oct. 30, 2018, from corresponding FI application No. 20185307.
(Continued)

*Primary Examiner* — Michael A Keller
(74) *Attorney, Agent, or Firm* — Nixon & Vanderhye

(57) ABSTRACT

Disclosed is a method for establishing a communication session. First, the communication session is initiated by a server. Next, a first connection request is generated for a voice call between a first WebRTC device and a second WebRTC device over a WebRTC gateway device. A second connection request including an identifier of first WebRTC device is generated towards a connection management server. Next, an inquiry to the connection management server by the second WebRTC device is generated for determining if a connection request is received from the first WebRTC device, and in that case the communication session including both the first connection for the voice call and a second connection is established.

16 Claims, 4 Drawing Sheets

(51) Int. Cl.
*H04M 15/00* (2006.01)
*H04W 4/24* (2018.01)
*H04L 12/66* (2006.01)

(52) U.S. Cl.
CPC .......... *H04L 65/102* (2013.01); *H04L 65/104* (2013.01); *H04L 65/1046* (2013.01); *H04L 65/1089* (2013.01); *H04L 65/4015* (2013.01); *H04M 15/00* (2013.01); *H04M 15/80* (2013.01); *H04M 15/82* (2013.01); *H04M 15/8228* (2013.01); *H04W 4/24* (2013.01); *H04M 15/8005* (2013.01)

(58) Field of Classification Search
CPC ............. H04L 65/1089; H04L 65/1046; H04L 65/102; H04L 45/74; H04L 67/02; H04L 65/608; H04L 65/103; H04M 15/80; H04M 15/00; H04M 15/82; H04M 15/8228; H04M 15/8005; H04M 15/10; H04W 4/24
See application file for complete search history.

(56) References Cited

U.S. PATENT DOCUMENTS

| 10,085,124 | B2* | 9/2018 | Patel | H04L 67/02 |
| 2015/0029296 | A1 | 1/2015 | Ni et al. | |
| 2017/0171508 | A1* | 6/2017 | Pang | H04N 21/4126 |
| 2017/0195391 | A1* | 7/2017 | Elad | H04L 67/02 |
| 2020/0036703 | A1* | 1/2020 | Håkansson | H04L 65/1073 |
| 2020/0099789 | A1* | 3/2020 | Miller | H04L 65/1063 |

OTHER PUBLICATIONS

European Search Report for Application No. 19 16 6665 dated Jul. 8, 2019.

* cited by examiner

SOLUTION FOR ESTABLISHING A COMMUNICATION SESSION

TECHNICAL FIELD

The invention concerns in general the technical field of telecommunication. More particularly, the invention concerns a solution for establishing a communication session between parties.

BACKGROUND

The current trend in customer service is to enable interaction between a customer and a service provider remotely by using modern technologies in a field of telecommunications. Traditionally, the interaction in the remote customer service has been implemented with voice i.e. the customer e.g. calls to service provider's customer service. A more sophisticated solution is that the interaction is performed with a video call by applying a specific hardware and software application executed by the hardware for the service session.

A recent technology taken into use in remote communication in which both voice and video are involved in is so called web real-time communication (WebRTC) technology. The WebRTC technology allows audio or video communication to work inside web pages by allowing direct peer-to-peer communication, eliminating the need to install plugins or download native apps. Hence, the audio or video communication may be established with web browser which simplifies a user experience since an application familiar to the user may be used for voice call or video sessions.

Applying the WebRTC technology for customer service solutions has a deficiency in that the WebRTC does not have tools for implementing a charging of the connection, or on the customer service. Generally speaking, it depends on the type of customer service the payer of the connection and/or the customer service itself may be the end customer or the service provider of the customer service. Hence, there is need to develop solutions which alleviate the deficiency and enables at least a generation of data on the basis of which the charging of the customer service connection may be performed.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method and a communication system for establishing a communication session. Another objective of the invention is that at least portion of the communication session is established with web real-time communication.

The objectives of the invention are reached by a method and a communication system as defined by the respective independent claims.

According to a first aspect, a method for establishing a communication session is provided, the method comprising: receiving, by a server, a request for establishing a communication session from a first web real-time communication, WebRTC, device to a second web real-time communication, WebRTC, device; acknowledging, by the server, the request to the first WebRTC device; and in response to a receipt of the acknowledging: generating a first connection request for a voice call, the first connection request comprising at least a network address of the first WebRTC device towards a WebRTC gateway device for establishing a first connection for voice call to the second WebRTC device, the WebRTC gateway device configured to transfer the first connection request to a public switched telephone network; generating a second connection request comprising an identifier representing the first WebRTC device towards a connection management server implementing WebRTC based communication; and in response to an establishment of the first connection for the voice call by the second WebRTC device: generating an inquiry to the connection management server by the second WebRTC device for determining if a connection request is received from the first WebRTC device with which the first connection for the voice call is established by the second WebRTC device, the inquiry to the connection management server carrying an identifier representing the first WebRTC device from which the first connection for the voice call is established; and in response to a determination that the connection management server stores an indication on the connection request from the first WebRTC device establishing a communication session between the first WebRTC device and the second WebRTC device, the communication session comprising both the first connection for the voice call and a second connection.

The request for establishing a communication session from a first WebRTC device may comprise data for authenticating the first WebRTC device by the server.

Further, the method may comprise a step of generating, by the public switched telephone network, data record for storing charging data associated to the communication session established.

The identifier representing the first WebRTC device from which the first connection for the voice call is established may be obtained by the second WebRTC device by inquiring it from a database storing the identifier associated with the network address of the first WebRTC device, the inquiry to the database comprising a network address of the first WebRTC device obtained from the first connection request for the voice call received by the second WebRTC device.

The identifier representing the first WebRTC device may be the second connection request specific and generated in response to the receipt of the acknowledgement from the server by one of the following: the first WebRTC device, the connection management server.

The identifier representing the first WebRTC device obtained from the database may comprise a link address to the connection management server for associating, by the connection management server, the second connection request from the first WebRTC device with the inquiry to the connection management server from the second WebRTC device.

Moreover, the second connection may be established with web real-time communication technology.

Still further, data may be carried over the second connection, the data being at least one of the following: real-time video data, video data file, document data, chat application data.

According to a second aspect, a communication system for establishing a communication session is provided, the system comprising: a first web real-time communication, WebRTC, device and a second web real-time communication, WebRTC, device; a server configured to acknowledge, to the first WebRTC device, a request for establishing a communication session from the first WebRTC device to the second WebRTC device; a WebRTC gateway device configured to, in response to a receipt of a first connection request for a voice call comprising at least a network address of the first WebRTC device, establish a first connection for the voice call to the second WebRTC device, the WebRTC gateway device configured to transfer the first connection request to a public switched telephone network; a connection management server configured to receive a second connection request comprising an identifier representing the first WebRTC device, the connection management server configured to implement WebRTC based communication; wherein the system in response to an establishment of the first connection for the voice call by the second WebRTC device: the second WebRTC device is configured to generate an inquiry to the connection management server for determining if a connection request is received from the first WebRTC device with which the first connection for the voice call is established by the second WebRTC device, the inquiry to the connection management server is configured to carry an identifier representing the first WebRTC device from which the first connection for the voice call is established; and wherein the system, in response to a determination that the connection management server stores an indication on the connection request from the first WebRTC device, a communication session between the first WebRTC device and the second WebRTC device is configured to be established), the communication session comprising both the first connection for the voice call and a second connection.

The server may be configured to acknowledge the first WebRTC device the request for establishing a communication session from the first WebRTC device to the second WebRTC device in response to an authentication of the first WebRTC device by the server based on authentication data received in the request.

The public switched telephone network may be configured to generate data record for storing charging data associated to the communication session established.

The second WebRTC device may be configured to obtain the identifier representing the first WebRTC device from which the first connection for the voice call is established by inquiring it from a database storing the identifier associated with the network address of the first WebRTC device, the inquiry to the database comprising a network address of the first WebRTC device obtained from the first connection request for the voice call received by the second WebRTC device.

The first WebRTC device or the connection management server may be configured to generate, in response to the receipt of the acknowledgement from the server, the identifier representing the first WebRTC device, the identifier representing the first WebRTC device being the second connection request specific.

The connection management server may be configured to associate the second connection request from the first WebRTC device with the inquiry to the connection management server from the second WebRTC device on a basis of a link address in the identifier representing the first WebRTC device obtained from the database.

Moreover, the communication system may be configured to establish the second connection with web real-time communication technology.

Still further, the communication system may be configured to carry, over the second connection, at least one of the following: real-time video data, video data file, document data, chat application data.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically a communication environment in which the invention may be applied to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
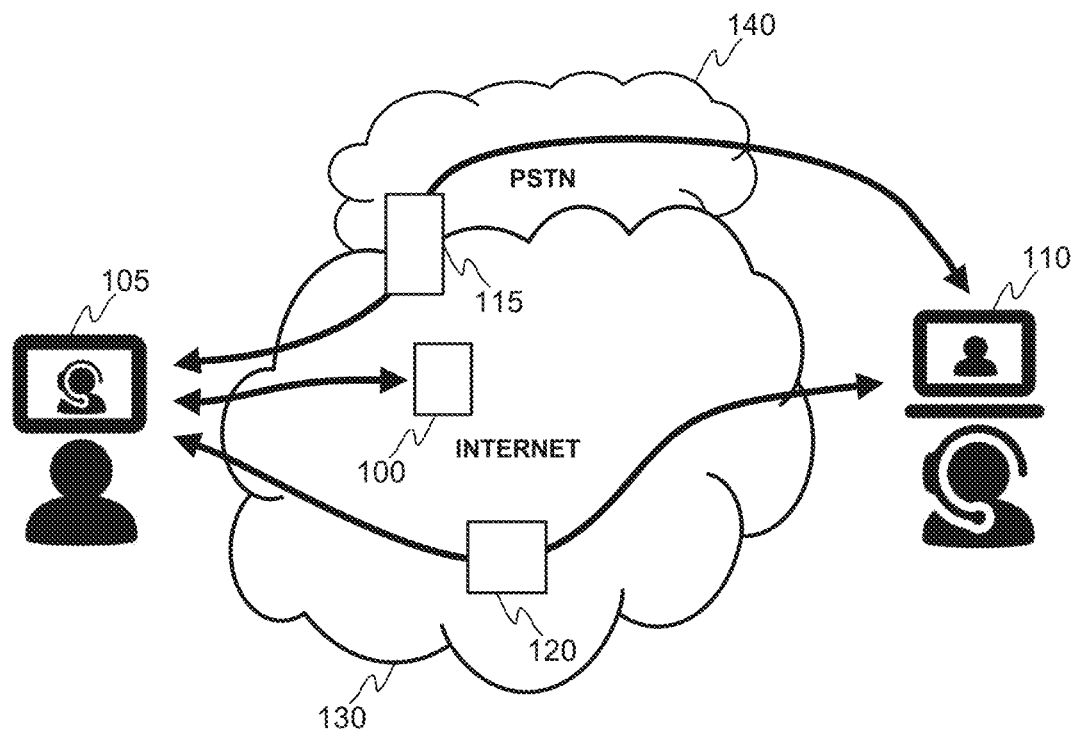

FIG. 1 illustrates schematically a communication environment into which a solution according to the present invention may be implemented to. A communication system forming the communication environment may comprise a first communication device 105 and a second communication device 110 both being configured to implement so called web real-time communication (WebRTC) technology among any other communication technology. The first and the second WebRTC devices 105, 110 may be any devices which are suitable for communicating with the manner as will be described. The devices 105, 110 may be configured to manage at least two connections established at least in part concurrently, wherein one of the connections may be established over Internet Protocol (IP) based network 130, such as Internet, and the other connection may be established, at least in part, over a public switched telephone network (PSTN) 140. The first connection may be configured to carry other type data content that the other connection. For example, the first connection may carry voice in a form of a voice call, whereas the other connection, i.e. the second connection, may carry another type of data, such as real-time video data, video data file, document data, chat application data, or similar, over WebRTC technology. In some application area the first WebRTC device 105 is a client device suitable for establishing the connections to the second WebRTC device 110 representing a customer service center. At least one of the devices 105, 110 may be equipped with a camera for capturing image data conveyable as the video data content to the other party of the communication.

Further, the communication system may comprise a server 100 providing a service for initiating an establishment of a communication session between the parties, i.e. the first WebRTC device 105 and the second WebRTC device 110. Moreover, the communication system may comprise a WebRTC gateway device 115 for establishing the first connection for a voice call to the second WebRTC device 110, wherein the WebRTC gateway device 115 may be configured to transfer the call connection request to PSTN 140, such as a mobile communication network, from the IP based communication network 130. The PSTN 140 advantageously comprises at least one system for generating a data record for storing charging data associated to the communication session established. The charging data to be stored in the data record may be generated in accordance with voice call charging in the PSTN 140 by utilizing existing systems, and functionalities, in the PSTN 140. For example, the charging data may be generated, at least in part, by so called IP multimedia sub-system or by an intelligent network being involved in call connection establishment. Still further, the communication system may comprise a connection management server 120 for establishing the second connection between the parties, the second connection may be associated with the first connection for the voice call for establishing the communication session.

Figure 2:
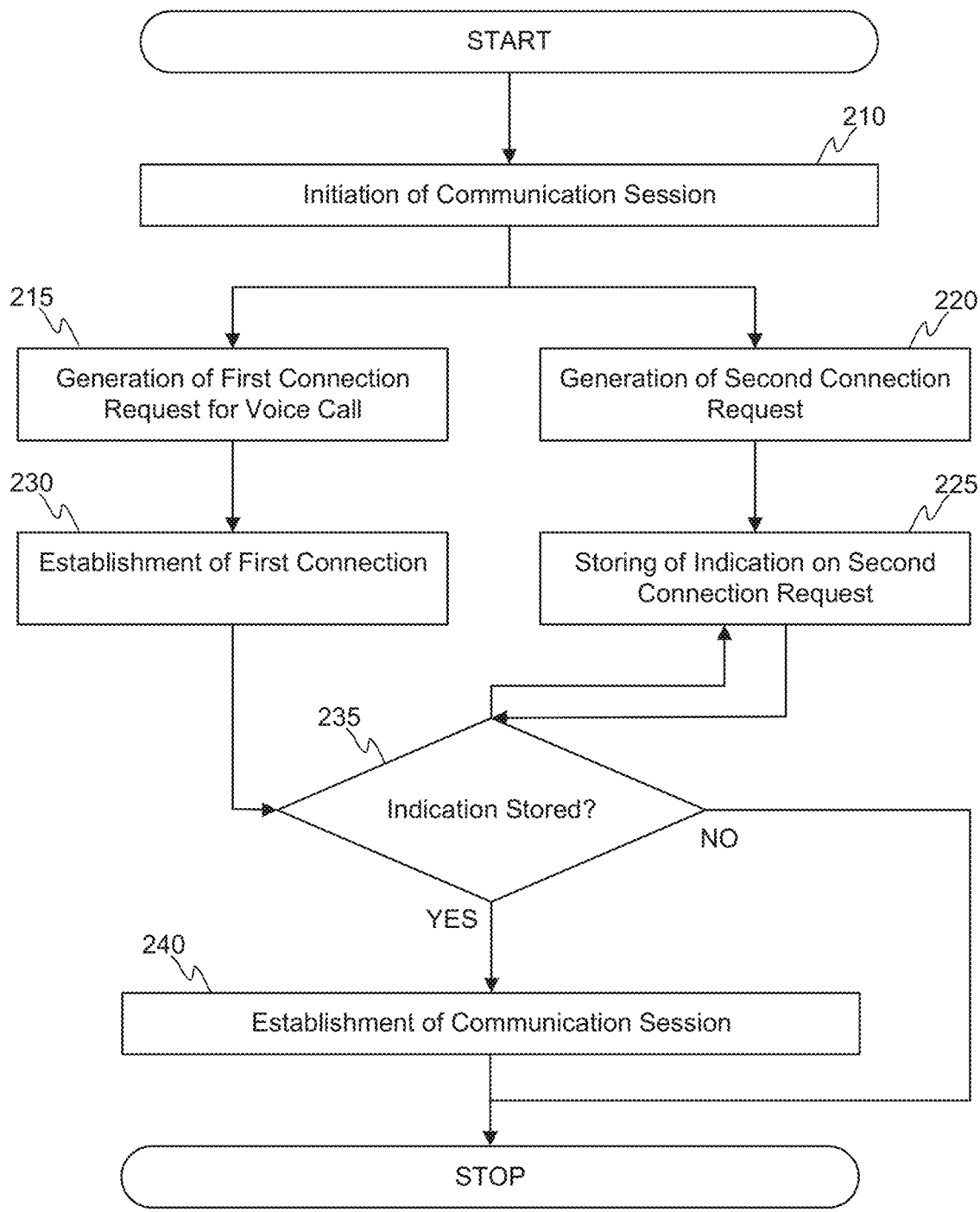
FIG. 2 illustrates schematically an example of a method according to an embodiment of the invention.

Next the invention will be described by referring to FIG. 2 illustrating an example of a method according to the present invention. The example of the method is described, for sake of clarity, in a non-limiting scenario wherein the first connection is related to a voice call connection and the second connection is related to a real-time video connection. An establishment of a communication session may be initiated 210 in some manner. For example, a user of a first WebRTC device 105 may perform an action with the first WebRTC device 105 which causes signaling to a server 100. The action may refer to a trigger action generated with an input/output device of the first WebRTC device 105, for instance. Depending of an implementation the trigger action may e.g. be generated with an application executed by the first WebRTC device 105. The application may e.g. provide an interaction button to the user so that when the user activates the button, implemented e.g. with a touch screen of the first WebRTC device 105, a request to the server 100 is generated. The request for initiating the communication session may carry information identifying the first WebRTC device 105 and possibly information identifying the second WebRTC device 110 with whom the communication session is to be established. Moreover, the initiation of the communication session may be implemented so that the user willing to establish the communication session is required to be authenticated. The implementation in such as case may be such that the application through which the user initiates the session requests user credentials, such as a user name and a password, from the user for requesting the establishment of the communication session. Alternatively or in addition, the first WebRTC device 105 may comprise means for retrieving user specific data from a medium for authenticating the user. The means may e.g. be a reader device for the medium, such as for a smart card or for a tag or anything similar.

The server 100 receiving the request may be configured to perform one or more procedures for determining if the first WebRTC device 105 may be provided access to initiate the communication session. The procedure(s) may e.g. comprise identifying the user by comparing the received data to a stored data accessible to the server. For example, it may compare if the user credentials are correct or not. In case the server 100 determines that the communication session may be established with the first WebRTC device 105 it may be configured to acknowledge this to the first WebRTC device 105. In case the server 100 determines, for any reason, that the communication session may not be established with the first WebRTC device 105 it may be configured to cancel the initiation of the communication session 210 e.g. by generating a signal to the first WebRTC device 105 canceling the procedure.

The description of the method as schematically illustrated in FIG. 1 will now be continued in a situation that the outcome of the determination by the server 100 is that the first WebRTC device 105 may establish the communication session. Otherwise, the establishment of the communication session may be canceled. Hence, in response to a receipt of an acknowledgement from the server 100 the first WebRTC device 105 may be configured to generate a first connection request for a voice call 215 to the second WebRTC device 110. The generation of the first connection request for the voice call 215 may be arranged so that the first WebRTC device 105 automatically, in response to the receipt of the acknowledgement, initiates the generation. Alternatively, it may be arranged so that the first WebRTC device 105 may be configured to prompt the user to initiate the generation of the first connection request for the voice call 215 in response to the receipt of the acknowledgement. The first connection request may comprise at least a network address of the first WebRTC device 105, or any similar identifier, by means of which the subscriber represented by the first WebRTC device 105 may be identified in a communication network, such as in a mobile communication network. For example, the identifier may be a subscriber number in the communication network, such as a MSISDN. The generation of the first connection request for the voice call 215 may be conveyed to a WebRTC gateway device 115, which may be configured to transfer the first connection request for the voice call to the PSTN 140 from the IP based communication network 130. Moreover, the first WebRTC device 105 may be configured to, in response to a receipt of an acknowledgement from the server 100, generate a second connection request 220 to a connection management server 120. The generation of the first connection request for the voice call 215 and the generation of the second connection request 220 may be arranged to occur concurrently at least in part or consecutively to each other. The second connection request generated to the connection management server 120 may comprise an identifier representing the first WebRTC device 105 towards a connection management server 120 implementing WebRTC based communication. The implementation of the WebRTC based communication may e.g. refer to an implementation that the connection management server 120 implements the WebRTC communication technology for providing data over the WebRTC technology between the parties of communication or the connection management server 120 may be involved in establishing the communication with WebRTC technology in any manner. Further, the identifier specific to the second connection may e.g. identify a communication environment, such as a unique video room name specific in a context of real-time video data to the subscriber in question. The identifier specific to the second connection may be generated by the first WebRTC device 105, by an application executed by the device 105, in response to the acknowledgement in step 210. Alternatively or in addition, the generation of the identifier specific to the second connection may be generated by any other entity, such as the connection management server 120, in response to an applicable signaling. The generated identifier specific to the second connection may also be delivered, i.e. stored, to data storage accessible to the second WebRTC device 110. In response to the receipt of the second connection request the connection management server 120 may be configured to store an indication on the received second connection request in data storage. The indication may comprise an identifier of the first WebRTC device 105, which identifies the first WebRTC device 105 either directly or indirectly. An example of an identifier identifying the first WebRTC device 105 directly may e.g. be a network address of the first WebRTC device 105 whereas the identifier specific to the second connection may be an example of an identifier indirectly identifying the first WebRTC device 105. In some embodiment the identifier may comprise a link address for establishing the second connection. The link address may comprise a network address and/or a virtual address identifying the video session to be established.

Next, in response to an establishment of the first connection for the voice call 230 experienced by the second WebRTC device 110 further operations may be conducted. The establishment of the first connection for voice call 230 shall in this context be understood at least to cover the following: a receipt of the first connection request in the second WebRTC device 110, accepting the first connection request by the second WebRTC device 110 for establishing the voice call connection over the first connection.

In response to the establishment of the voice call connection over the first connection 230 mentioned above the second WebRTC device 110 may be configured to obtain an identifier of the first WebRTC device 110 from the first connection request for the voice call. Next, the second WebRTC device 110 may be configured to generate an inquiry to the connection management server 120, to any other entity, such as to a predetermined data storage, for determining 235 if a connection request is received from the first WebRTC device 105 with which the first connection for the voice call is established by the second WebRTC device 110. The inquiry to the connection management server 120 may carry an identifier representing the first WebRTC device 105 from which the voice call connection over the first connection is established. The connection management server 120 may be configured to respond to the inquiry in a manner providing information if the connection management server 120, or the data storage, stores in indication that the connection request is received. In case there is no indication on the connection request the second WebRTC device 110 may be configured to terminate the establishment of the communication session. Alternatively, in response to a determination that the connection management server 120 stores an indication on the connection request from the first WebRTC device 105 a communication session may be established 240 between the first WebRTC device 105 and the second WebRTC device 110. As a result, the communication session established in the manner as described comprises both the voice call connection over the first connection and the second connection so that the voice content may be delivered, at least in part, through another route than another content. The other content may e.g. be a real-time video data, data files carrying video data or document data, chat application data, or any combination of these, which other content is carried by utilizing WebRTC technology at least in part. The connection management server 120 may advantageously be configured to implement one or more functionalities which enable carrying the data between the parties over the second connection.

As indicated the connection management server 120 may be configured to convey the data over the second connection. In a further embodiment the transfer of data over the second connection may be implemented so that the connection management server 120 may be configured to link the first and the second WebRTC devices 105, 110 together, but the data transfer is performed over so-called peer-to-peer connection directly between the communicating parties. This may e.g. be achieved so that the connection management server 120 transmits information on at least a network address, such as an IP address, of the other communicating party to each communicating party i.e. the network address of the first WebRTC device 105 to the second WebRTC device 110 and vice versa. In response to a receipt of the network address, or addresses, the second connection may be established directly between the parties as a peer-to-peer connection, for example. In this kind of an embodiment a role of the connection management server 120 is, more or less, to operate as an entity, which enables connection between the devices 105, 110 at least in part by means of identifying that the communicating parties are searching each other.

In an embodiment of the invention in which the second WebRTC device 105 is configured to inquire from a data storage, such as from database, if an indication on the connection request is stored, it may be arranged that the response to the inquiry comprises a link address to the connection in question. The link address may e.g. direct, by activating the link address, the second WebRTC device to initiate the connection towards the connection management server 120 wherein the connection e.g. carries an identifier of the connection in question. In this manner the connection management server 120 may associate the connection requests received from the first WebRTC device 105 and from the second WebRTC device 110 together. The inquiry performed by the second WebRTC device 110 to the data storage may be arranged so that the inquiry is performed directly to the data storage or indirectly over another entity. The other entity may e.g. be a back-end device or a server device, such as a web server, which may be instructed to access the data storage by the second WebRTC device 110 with signaling, for instance.

Figure 3:
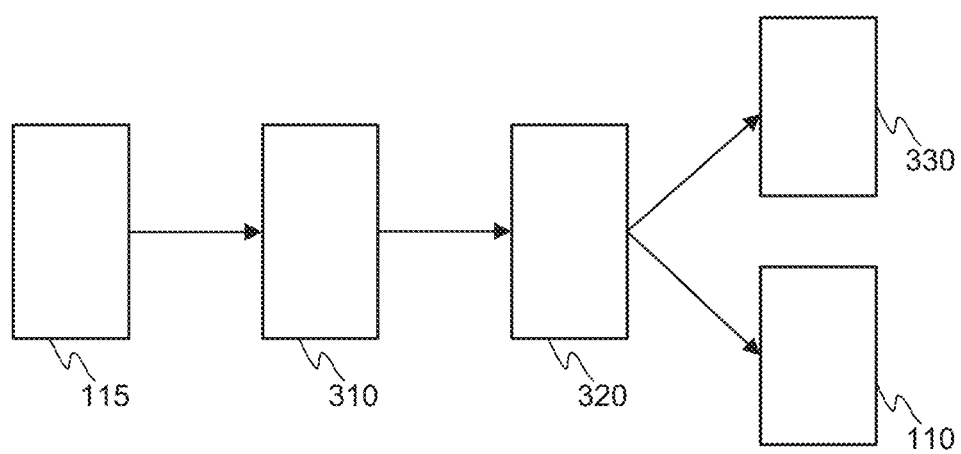
FIG. 3 illustrates schematically aspects relating to a voice call connection establishment according to an embodiment of the invention.

Next, some aspects with respect to an establishment of the first connection for the voice call, as described above, is discussed by referring to FIG. 3. As already mentioned the WebRTC gateway device 115 may be configured to transfer the call connection request over the first connection to PSTN 140. The first connection may be initiated by the user of the first WebRTC device 105 with an application software executed by the first WebRTC device 105. The application software may e.g. be an internet browser which supports WebRTC technology. In response to a receipt of the first connection request for the voice call in the WebRTC gateway device 115 the WebRTC gateway device 115 may be configured to obtain an identifier, such as a network address, representing the first WebRTC device 105 and to generate a request towards one or more network elements implementing network functionalities in the PSTN side. According to an embodiment the WebRTC gateway device 115 may be configured to generate the request to a IP multimedia subsystem 310 with an applicable protocol, such as with a Session Initiation Protocol, SIP. As mentioned the request advantageously carries an identifier for the first WebRTC device 105 and the IP multimedia subsystem may obtain user related information from a register storing subscriber data, such as HSS (Home Subscriber Server). In response to operations performed by the IP multimedia subsystem 310 the voice call connection request is forwarded, as a SIP message, to a network element 320 configured to perform at least so-called SIP trunk functionalities. The SIP trunk network element 320 may be configured to facilitate the voice over IP connection to a network element 330 configured to perform PSTN related operations, such as a generation of charging data. The network element 330 may e.g. refer to an Intelligent Network (IN) by means of which dedicated charging, such as company specific pricing, may be applied to so that the receiver, i.e. the entity represented by the second WebRTC device 110 pays costs of the communication session. In other words, the SIP trunk network element performs necessary manipulation to at least some data carried in the SIP message, such as any number manipulation with respect to subscription represented by the first WebRTC device 105 or the second WebRTC device 110 or both. Further, the SIP trunk network element may deliver the first connection request to the second WebRTC device 110, which is configured to execute an application suitable to managing a call connection over PSTN. The identifier of the calling party and the called party may be any applicable network identifier, such as a MSISDN or Session Initiation Protocol (SIP) address.

It is worthwhile to mention that network entities for delivering the first connection for the voice call as described above are non-limiting examples of suitable entities. However, the first connection may be arranged in any other manner over the PSTN than described. For example, in some implementation the IP Multimedia Subsystem may be omitted, and the SIP trunk network element 320 may be configured to take care of the establishment of the first connection for the voice call.

Figure 4:
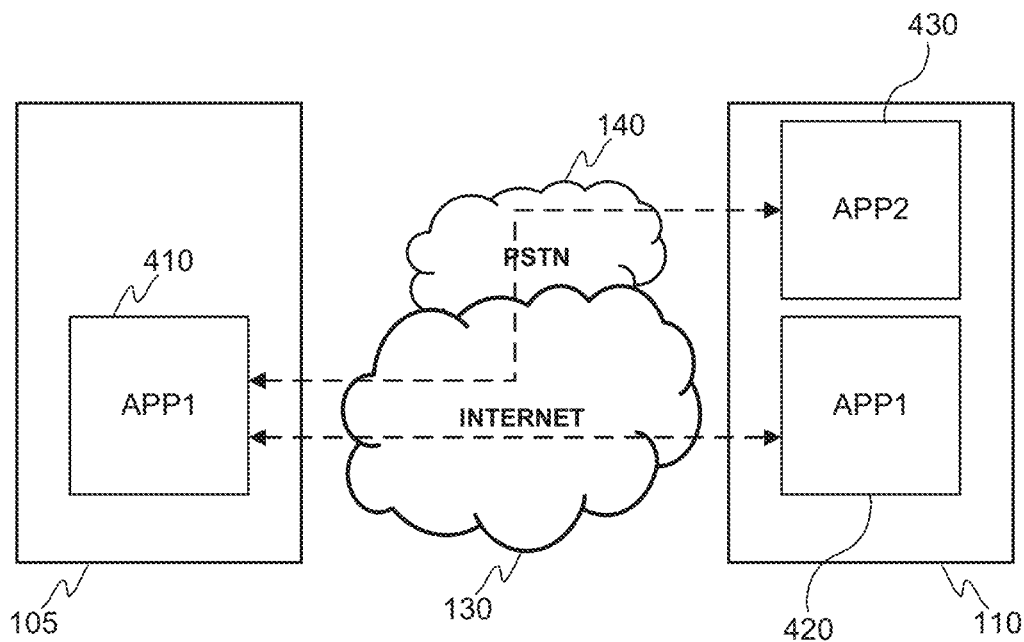
FIG. 4 illustrates schematically further aspects relating to an embodiment of the invention.

FIG. 4 illustrates schematically further aspects of the present invention. As mentioned the established communication session comprises both the first connection for the voice call and the second connection for other data so that the voice data may be delivered, at least in part, through another route than the other data. The first WebRTC device 105 may be configured to initiate an establishment of the communication session in the manner as described. The initiation may be performed by an application executed by the first WebRTC device 105 wherein the application supports the WebRTC technology. A non-limiting example of the application may e.g. be an Internet browser, or a dedicated communication application, configured to support the WebRTC technology. Since the communication initiated by the first WebRTC device 105 is divided to two separate communication paths, as discussed, the second WebRTC device 110 may be arranged to execute such an application or applications which is/are suitable for control the communication from each of the communication paths. According to an embodiment the second WebRTC device 110 may be configured to execute two applications 420, 430. The first application 420 may be configured to support an establishment of the second connection, and, thus, the other data content delivered over the second connection, such as video data, whereas the second application 430 may be configured to support the first connection for the voice call received at least in part over the PSTN 140. Again, the first application 420 executed by the second WebRTC device 110 may be an Internet browser, or a dedicated communication application, configured to support the WebRTC technology. The second application 430, in turn, may e.g. be voice call application providing a signaling interface towards a communication network delivering the voice call over the first connection between the communicating parties. Advantageously, the delivery of data through the communication paths is synchronized so that a timing of the voice carried over the voice call connection and the other data, such as image data or chat data, carried over the second connection are in sync at the receiver end. This may e.g. be achieved by including time stamps in the delivered data at the transmitter end, wherein the output of the pieces of data is performed based on the time stamps.

The description of an embodiment of the invention above is mainly based on an idea that the first WebRTC device 105 is configured to establish the voice call connection over the first connection and the second connection towards the mentioned entities, such as the WebRTC gateway device 115 and the connection management server 120. However, the present invention is not limited only to such an implementation, but it may be arranged that the first WebRTC device 105 initiates all communication i.e. both the first connection for the voice call and the second connection to a same network node, which is configured to divide the first connection and the second connection towards different entities, such as towards the WebRTC gateway device 115 and the connection management server 120. The network node for dividing the connections may a distinct network node to the mentioned ones or it may even be one of the following: a server 100, the WebRTC gateway device 115 or the connection server 120.

Figure 5:
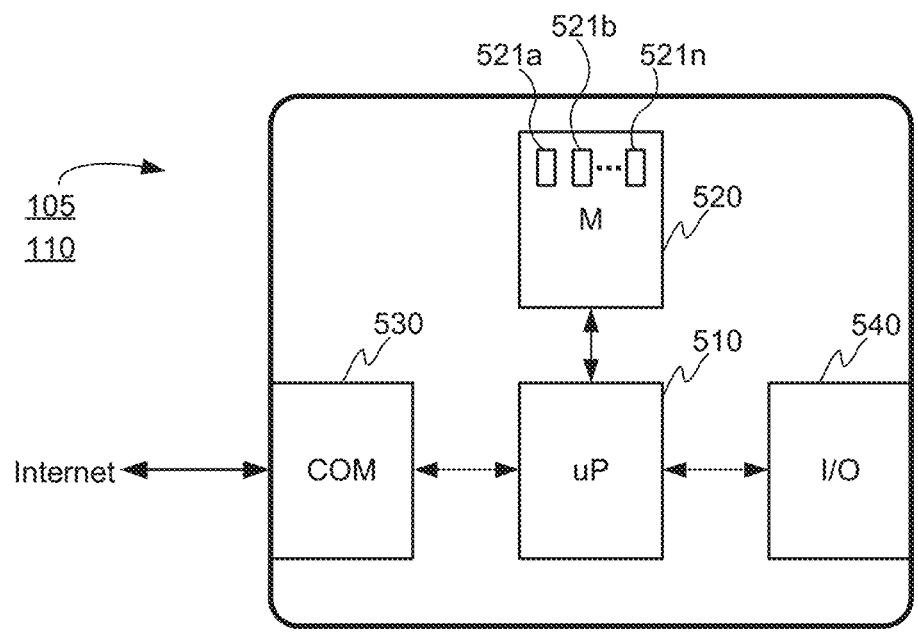
FIG. 5 illustrates schematically an example of a communication device according to an embodiment of the invention.

As mentioned the communication system forming the communication environment may comprise a first communication device 105 and a second communication device 110 both being configured to implement so called web real-time communication (WebRTC) technology among any other communication technology. Moreover, the communication system may comprise a server 100, a WebRTC gateway device 115 and a connection management server 120 for establishing a communication session comprising both the first connection for the voice call and the second connection. An example of the first or the second WebRTC device 105, 110 is schematically illustrated in FIG. 5. The WebRTC device 105, 110 may be configured to implement at least part of the method for establishing the communication session as described. The execution of the method, or at least some portion of it, may be achieved by arranging a processor 510 to execute at least some portion of computer program code 521a-521n stored in a memory 520 causing the processor 510, and, thus, the WebRTC device 105, 110 to implement one or more method steps as described. The computer program code 521a-521n, when executed by the processor, may implement at least some of the functionalities of the application(s) 410 or 420, 430, as referred in the context of the description of FIG. 4. In other words, the processor 510 may be arranged to access the memory 520 and to retrieve and to store any information therefrom and thereto. Moreover, the processor 510 may be configured to control the communication through one or more communication interface 530, such as through a plurality of Local Area Network (LAN) interfaces. Hence, the communication interface 530 may be arranged to implement, possibly under control of the processor 510, a corresponding communication protocol, such as an IP, in question. Further, the WebRTC device 105, 110 in question may comprise one or more input/output devices 540 for inputting and outputting information. Such input/output devices may e.g. be keyboard, buttons, touch screen, display, loudspeaker, camera and so on. In some implementation of the WebRTC device 105, 110 at least some of the in-put/output devices may be external to the WebRTC device 105, 110 and coupled to it either wirelessly or in a wired manner. For sake of clarity, the processor 510 herein refers to any unit or a plurality of units suitable for processing information and control the operation of the WebRTC device 105, 110 in general at least in part, among other tasks. The mentioned operations may e.g. be implemented with a microcontroller solution with embedded software. Similarly, the invention is not limited to a certain type of memory 520 only, but any memory unit or a plurality of memory units suitable for storing the described pieces of information, such as portions of computer program code and/or parameters, may be applied in the context of the present invention. Even if it is disclosed that the method may be implemented with one WebRTC device 105, 110, it may also be arranged that the implementation of the method, or at least some portions of it, is performed in multiple devices operatively coupled to each other either directly or indirectly as a distributed implementation. In case the WebRTC device 105, 110 is integrated with to another network entity the functionality of the WebRTC device 105, 110 is advantageously implemented in the manner as described.

Figure 6:
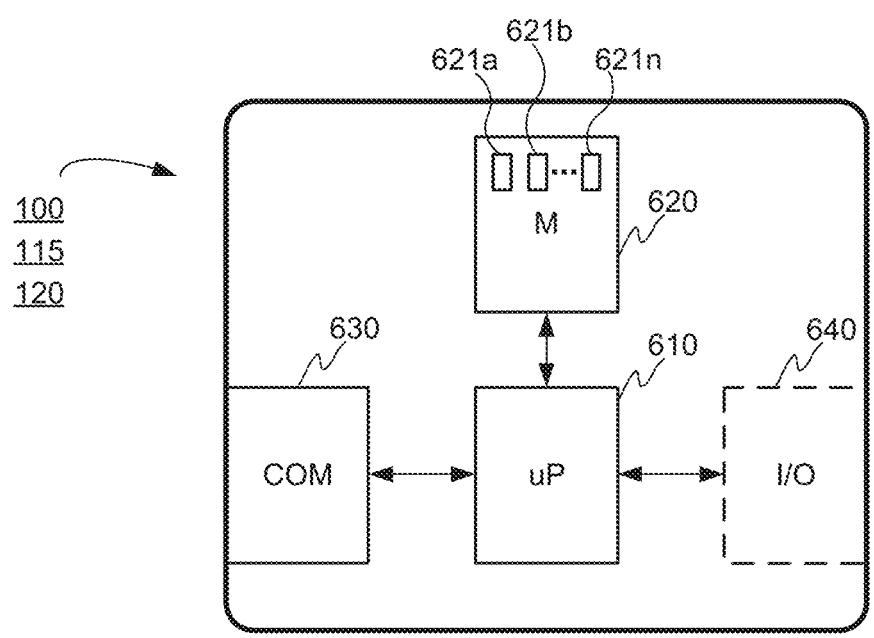
FIG. 6 illustrates schematically an example of a network node according to an embodiment of the invention.

FIG. 6, in turn, illustrates schematically an example of a network node, such as a server 100, a WebRTC gateway device 115, or a connection management server 120. All these devices may comprise a processor 610, a memory 620 storing data, such as portions of computer program code 621a-621n, a communication interface 630 and possibly input/output devices 640 for inputting and outputting information. Depending on a task the device in question may be implemented so that the communication interface is configured to implement one or more communication technology, such as the WebRTC gateway device 115 may be configured to execute both the applied technology in the Internet side as well as the applied technology in the PSTN side and even implement a conversion of the communication between the two entities.

The description of at least some aspects of the present invention is performed in a communication system with separate network devices, such as the server 100, the WebRTC gateway device 115, the connection management server 120. Generally speaking, the communication system, according to an embodiment of the invention, may comprise means for performing the described method in the communication system. The means may be arranged in the same computing device, such as in a server, or it may be distributed computing environment, in which the operations and functionalities are shared between separate network nodes.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for establishing a communication session, the method comprising:
receiving, by a server, a request for establishing a communication session from a first web real-time communication (WebRTC) device to a second WebRTC device;
acknowledging, by the server, the request to the first WebRTC device;
and in response to a receipt of the acknowledging:
generating, by the first WebRTC device, a first connection request for establishing a voice call with the second WebRTC device, the first connection request comprising at least a network address of the first WebRTC device, and the first connection request directed to a WebRTC gateway device for establishing a first connection for the voice call to the second WebRTC device, the WebRTC gateway device configured to transfer the first connection request to a public switched telephone network,
generating, by the first WebRTC device, a second connection request to a connection management server implementing WebRTC based communication, the second connection request comprising an identifier representing the first WebRTC device;
and in response to an establishment of the first connection for the voice call by the second WebRTC device:
generating, at the second WebRTC device, an inquiry to the connection management server for determining if a connection request is received from the first WebRTC device with which the first connection for the voice call is established, the inquiry to the connection management server carrying an identifier representing the first WebRTC device from which the first connection for the voice call is established, and
in response to a determination, by the second WebRTC device and based on a response from the connection management server to the inquiry carrying the identifier representing the first WebRTC device from which the first connection for the voice call is established, that the connection management server stores an indication on the connection request from the first WebRTC device, establishing a communication session between the first WebRTC device and the second WebRTC device, the communication session comprising both the first connection for the voice call and a second connection.

2. The method of claim 1, wherein the request for establishing a communication session from the first WebRTC device comprises data for authenticating the first WebRTC device by the server.

3. The method of claim 1, further comprising:
generating, by one of i) a IP multimedia sub-system residing in the public switched telephone network or ii) an intelligent network involved in call connection establishment and residing in the public switched telephone network, a data record for storing charging data associated to the communication session established, wherein the charging data is generated in accordance with voice call charging.

4. The method of claim 1, wherein the identifier representing the first WebRTC device from which the first connection for the voice call is established is obtained by the second WebRTC device via an inquiry to a database storing the identifier associated with the network address of the first WebRTC device, the inquiry to the database comprising the network address of the first WebRTC device obtained from the first connection request for the voice call received by the second WebRTC device.

5. The method of claim 1, wherein the identifier representing the first WebRTC device is the second connection request specific to and generated in response to receipt of the acknowledgement from the server by the first WebRTC device.

6. The method of claim 1, wherein the identifier representing the first WebRTC device comprises a link address to the connection management server for associating, by the connection management server, the second connection request from the first WebRTC device with the inquiry to the connection management server from the second WebRTC device.

7. The method of claim 1, wherein the second connection is established with web real-time communication technology.

8. The method of claim 1, wherein data is carried over the second connection, the data being at least one of the following: real-time video data, video data file, document data, and chat application data.

9. A communication system for establishing a communication session, the system comprising:
 a first web real-time communication (WebRTC) device and a second WebRTC device;
 a server configured to acknowledge, to the first WebRTC device, a request for establishing a communication session from the first WebRTC device to the second WebRTC device;
 a WebRTC gateway device configured to, in response to a receipt of a first connection request for a voice call with the second WebRTC device, the first connection request comprising at least a network address of the first WebRTC device, establish a first connection for the voice call to the second WebRTC device, the WebRTC gateway device configured to transfer the first connection request to a public switched telephone network; and
 a connection management server configured to receive a second connection request comprising an identifier representing the first WebRTC device, the connection management server configured to implement WebRTC based communication,
 wherein the second WebRTC device is configured, in response to an establishment of the first connection for the voice call by the second WebRTC device, to generate an inquiry to the connection management server for determining if a connection request is received from the first WebRTC device with which the first connection for the voice call is established by the second WebRTC device, and the inquiry to the connection management server carries an identifier representing the first WebRTC device from which the first connection for the voice call is established, and
 wherein, upon a determination, based on a response from the connection management server to the inquiry carrying the identifier representing the first WebRTC device from which the first connection for the voice call is established, that the connection management server stores an indication on the connection request from the first WebRTC device, a communication session between the first WebRTC device and the second WebRTC device is established, the communication session comprising both the first connection for the voice call and a second connection.

10. The communication system of claim 9, the server is configured to acknowledge to the first WebRTC device the request for establishing a communication session from the first WebRTC device to the second WebRTC device in response to an authentication of the first WebRTC device by the server based on authentication data received in the request.

11. The communication system of claim 9,
 wherein the public switched telephone network, via an IP multimedia sub-system residing in the public switched telephone network or an intelligent network involved in call connection establishment and residing in the public switched telephone network, is configured to generate a data record for storing charging data associated to the established communication session, and
 wherein the charging data is generated in accordance with voice call charging.

12. The communication system of claim 9, wherein the second WebRTC device is configured to obtain the identifier representing the first WebRTC device from which the first connection for the voice call is established via an inquiry to a database storing the identifier associated with the network address of the first WebRTC device, the inquiry to the database comprising the network address of the first WebRTC device obtained from the first connection request for the voice call received by the second WebRTC device.

13. The communication system of claim 9, wherein the first WebRTC device is configured to generate, in response to receipt of the acknowledgement from the server, the identifier representing the first WebRTC device, the identifier representing the first WebRTC device being specific to the second connection.

14. The communication system of claim 9, the connection management server is configured to associate the second connection request from the first WebRTC device with the inquiry to the connection management server from the second WebRTC device on a basis of a link address in the identifier representing the first WebRTC device.

15. The communication system of claim 9, the communication system is configured to establish the second connection with web real-time communication technology.

16. The communication system of claim 9, wherein the communication system is configured to carry, over the second connection, data of at least one of the following: real-time video data, video data file, document data, and chat application data.

* * * * *